United States Patent [19]

Nagano et al.

[11] 3,949,118

[45] Apr. 6, 1976

[54] PROCESS FOR SOLDERING DIFFICULTLY SOLDERABLE MATERIAL HAVING OXIDE SURFACE AND A SOLDER ALLOY THEREFOR

[75] Inventors: Kentaro Nagano; Kohji Nomaki; Yoshihito Saoyama, all of Yokohama, Japan

[73] Assignee: Asahi Glass Company, Ltd., Tokyo, Japan

[22] Filed: Aug. 9, 1974

[21] Appl. No.: 496,162

Related U.S. Application Data

[63] Continuation of Ser. No. 273,790, July 21, 1972, abandoned.

[52] U.S. Cl. ............... 427/57; 427/123; 427/314; 427/319; 427/357; 75/166 C; 75/175 A; 228/110
[51] Int. Cl.² .... C23C 1/04; C23C 1/06; C23C 1/16
[58] Field of Search .................... 117/DIG. 8, 47 H; 75/166 R, 166 A, 166 B, 166 C, 166 D, 166 E, 175 R, 175 A; 29/504, 473.1; 427/57, 123, 314, 319, 357

[56] References Cited
UNITED STATES PATENTS

| | | | |
|---|---|---|---|
| 2,397,400 | 3/1946 | Barwich | 117/DIG. 8 |
| 3,103,067 | 9/1963 | Dixon | 75/166 R X |
| 3,694,897 | 10/1972 | Akeyoshi et al. | 29/473.1 |
| 3,730,761 | 5/1973 | Smith | 117/DIG. 8 |
| 3,744,121 | 7/1973 | Nagano et al. | 29/504 X |

FOREIGN PATENTS OR APPLICATIONS

| | | | |
|---|---|---|---|
| 481,072 | 2/1952 | Canada | 75/175 R |
| 1,204,500 | 11/1965 | Germany | 75/166 D |

*Primary Examiner*—Ronald J. Shore
*Attorney, Agent, or Firm*—Oblon, Fisher, Spivak, McClelland & Maier

[57] ABSTRACT

Difficultly solderable material having an oxide surface such as glass, ceramics or such metals as Si, Ge, Al, Ti, Zr or Ta is soldered using a solder alloy composed of 2–98.5% by wt. of Pb, 1–97.5% by wt. of Sn and 0.1–15% by wt. of rare earth metals, while applying vibration, preferably of the ultrasonic type.

4 Claims, No Drawings

PROCESS FOR SOLDERING DIFFICULTLY SOLDERABLE MATERIAL HAVING OXIDE SURFACE AND A SOLDER ALLOY THEREFOR

BACKGROUND OF THE INVENTION

1. Field Of The Invention

This is a continuation of Ser. No. 273,790 filed July 21, 1972, now abandoned.

This invention relates to a process for directly soldering a difficultly solderable material such as glass or ceramics or difficultly solderable metals such as silicon, germanium, aluminum, titanium, zirconium, tantalum or the like and to a solder alloy therefor.

2. Description Of The Prior Art

In the past, it has been difficult to directly apply a solder to an inorganic solid oxide product, such as glass, ceramics or metals having an oxide surface such as silicon, germanium, aluminum, titanium, zirconium, tantalum or the like. The present inventors have found a solder which will firmly adhere to difficultly solderable materials under ultrasonic vibration, the solder being in a group of alloys of Pb-Sn-Zn-Sb type alloys and Pb-Sn-Zn-Sb-Al type alloys. Such a solder alloy and the soldering process therefor have been disclosed in copending U.S. patent application Ser. No. 91,208, filed on Nov. 19, 1970 entitled "Process for Soldering Difficultly Solderable Metals, Such As Si, Ge, Al, Ti, Zr and Ta", which application has the same inventors and a common assignee.

While somewhat satisfactory, the eutectic temperature of the solder alloy of the above referenced copending application is 183°C. Such a eutectic temperature has been found to be too low and to have the disadvantages of melting a lower solder layer, when the solder is coated on a base and then a conventional solder is coated on the coated solder layer. Accordingly, it is difficult to obtain a favorable temperature in the soldering process.

Moreover, it has been found difficult to use the above described prior art solder alloy for sealing a part such as a vacuum tube which is operated in a high vacuum, since the solder alloy contains Zn which is easily vaporized.

SUMMARY OF THE INVENTION

Accordingly, it is one object of the present invention to provide a process for directly applying a solder to a difficultly solderable material having an oxide surface, wherein the adhesive strength of the solder bond is greater than the tensile strength of either the solder itself or that of the difficultly solderable material.

It is another object of this invention to provide a high temperature solder composition which does not contain any low temperature vaporizable components and which can be directly applied to a difficultly solderable material having an oxide surface.

Briefly, the foregoing and other objects can be attained by using a solder alloy substantially comprising lead, tin and a rare earth metal and by applying vibration, preferably ultrasonic vibration, during the soldering operation.

DETAILED DESCRIPTION OF THE PREFERRED EMBODIMENTS

The solder alloy used for this invention substantially consists of lead, tin, and a rare earth metal of the following composition in percent by weight.

| | |
|---|---|
| Pb | 2–98.5% |
| SN | 1–97.5% |
| rare earth metal | 0.1–15% |
| Zn | 0–30% |
| Sb | 0–30% |
| A | 0–0.1% |
| Si, Ti and/or Be | 0–0.5% |

The components of zinc, antimony, aluminum, silicon, titanium and beryllium are discretional components for the solder alloy and can be omitted if desired.

The solder alloy used for this invention contains lead, tin, and 0.1–15% by weight of a rare earth metal as the master alloy components.

In this invention, a rare earth metal means any of the 15 elements having an atomic number of 57 to 71 in the periodic table of Group III, namely, La, Ce, Pr, Nd, Pm, Sm, Eu, Gd, Tb, Dy, Ho, Er, Tm, Yb, Lu and similar elements of Y and Sc. In the preparation of the solder alloy of this invention, it is preferable to use cerium or commercially available mixed rare earth metals such as "misch metal" or "cerium misch metal" having Ce as a main component.

The typical cerium misch metal is composed of 86.8% wt. Ce, 3.0 wt. % La, 4.0 wt. % Nd, 6.2 wt. % Sm and Pr and impurities of 3.2 wt. % Fe, 0.37 wt. % Mg; 0.27 wt. % Al, and 0.073 wt. % Si. If the quantity of rare earth metal is less than 0.1% by weight, the solder will not be adhered to the oxide surface. Conversely, if the quantity of the rare earth metal is higher than 15% by weight thereof, it will be difficult to obtain a uniform structure when a solder alloy is produced. If the quantity of the rare earth metal is higher than 10% by weight, the bonding strength of the solder will be increased, but the ductability will be reduced so that it will be difficult to form a wire form solder. However, it is possible to use the solder by using the solder in the form of a rod, a mass or a liquid.

It is optimum that the weight of the rare earth metal for preparation of the solder be in the range of 1–4% for improvement of bond strength and formation of a wire form solder.

It is believed that the rare earth metals are easily oxidized, so that good affinity of the solder to the oxides, such as glass, ceramics, or the difficultly solderable metals, such as aluminum, silicon, etc., which are covered with an oxide layer, is obtained if the quantity of lead in the solder is more than 98.5% by weight or the quantity of tin in the solder is less than 1% by weight, the melting point and viscosity of the solder are increased so that the preparation of the solder and the soldering operation will be undesirably difficult and smoothness and airtightness of the solder layer coated on the base surface will be inferior. Conversely, if the quantity of lead is less than 2% by weight, or the quantity of tin is more than 97.5% by weight, the temperature range of the semi-melted condition, that is the mixture of solid solution crystals in a liquid form, will be too narrow during the soldering operation.

Accordingly, the molten solder will be solidified without forming the semi-molten solid solution crystals, and the soldering operation will be rather difficult. The quantity of lead and tin can be selected in the above range depending upon the application of the solder.

If a high bond strength is required, such as in the soldering of a glass plate to a metal holder used in the suspension construction of the glass plate, it is preferable to add 1–4% by weight of a rare earth metal to the solder base composed of 40–98 wt. % of Pb; 2–50 wt. % of Sn; especially 81–93 wt. % of Pb, and 3–9 wt. % of Sn.

On the other hand, in the applications wherein airtightness and smoothness of the surface or bonded face are more important than bond strength, such as for soldering electric or electronic parts, it is preferable to use solder comprising a predominant amount of Sn rather than Pb. Thus, for such applications, it is preferable to use a composition comprising 50–98 wt. % of Sn; 20–50 wt. % of Pb; 0.01–15 wt. % of a rare earth metal, especially 10–40 wt. % Pb, 60–90 wt. % Sn and 1–4 wt. % of a rare earth metal.

It should be understood that it is not always necessary to add zinc, however, the zinc component has the effect of improving bond strength with the oxide surface and hence enhances the effect of the rare earth metal. Such an advantageous effect will result when the quantity of zinc is more than 0.05% by weight. However, it is not suitable to add more than 30% by weight of zinc, since it will then become hard to form a uniform alloy structure. If the quantity of zinc is greater than 10% by weight, it will be hard to form a wire form solder, however, it will still be possible to solder by using a solder in the form of a rod, a mass or a liquid.

It is not always necessary to add antimony, however when more than 0.05% by weight of antimony is added, the water resistance and weather durability of the solder will be increased. However, it is not suitable to add more than 30% by weight of antimony, since it will become hard to form a uniform alloy structure. If the quantity of antimony is more than 10% by weight, it will be hard to form a wire form solder, however, it will still be possible to solder by using the solder in a form of a rod, a mass or a liquid.

Aluminum may be added to the alloy in amounts of less than 0.1% by weight in order to prevent the formation of a scale due to oxidation of the solder during the soldering operation. Good results are obtainable if the aluminum is added in amounts of from 0.01–0.1 wt. % and preferably in amounts from 0.02–0.05 wt. %. If the quantity of aluminum exceeds 0.1% by weight, the bond strength of the solder will be adversely affected.

In addition, one or more members of the group consisting of silicon, titanium, and beryllium may be incorporated into the solder in a combined amount of no more than 0.5 wt. %. These components can assist in the prevention of fogging or delustering of the solder surface. More specifically, these elements can be added in a combined amount of from 0.02–0.05 wt. % and can preferably be present in amounts of from 0.06–0.15 wt. %. If the total quantity of silicon, titanium and beryllium exceeds 0.5 wt. %, the bond strength of the solder may be reduced.

Since silicon, titanium and beryllium are very high melting point elements, it would be difficult to add these metals directly to the composition in their free metallic form. It is preferred, therefore, to introduce these metals to the solder composition in the form of muster alloys with copper or aluminum. Suitable muster alloys include the alloys of 75% Cu — 25% Ti; 85% Cu — 15% Si; and 96% Cu — 4% Be. In this instance, about 1–3% of copper will enter the solder composition. Although such small amounts of copper will not adversely affect the properties of the solder, the quantity of copper should not exceed 3%.

The solder alloy of this invention can be prepared by melting the above stated metal components in a vacuum or in a non-oxidative atmosphere, such as a neutral innert atmosphere, e.g. nitrogen and argon, or a reducing atmosphere, e.g. hydrogen.

One example of the preparation of the solder alloy is as follows:

The above metal components are melted, mixed and heated at 800°C in vacuo in a quartz tube for 5 minutes. The mixture is then stirred several times under vibration and is then reheated at 800°C for 5 minutes, and is continuously vibrated and cooled with water to obtain the solder alloy of this invention.

The thus prepared solder alloy of this invention has a melting point of 220°–320°C. Accordingly, it is quite easy to control the temperature, when the solder is coated onto a base. The lower melting solder having the melting point of 100°–183°C is then coated. The solder alloy of this invention will not only bond to metals having no oxide surface, but also will be firmly bonded to the following difficultly solderable materials having an oxide surface.

The solder can be directly applied to a wide variety of products including inorganic solid oxides; such as oxide glass, for instance silicate glass or silica glass; glass-ceramics; pottery or porcelain; sintered, fused or burned refractory oxides such as alumina, magnesia, spinel, thoria, berylia, zirconia; ceramics used for electronics or electric components such as barium titanate, ferrites, steatit, forsterite, titania; natural or synthetic inorganic oxide crystals such as quartz crystals, ruby or saphire; and cermets. The solder can be also directly applied to difficultly solderable metals having an oxide surface, such as silicon, germanium, aluminum, titanium, zirconium and tantalum.

The solder of this invention can be firmly bonded to the surface of the difficultly solderable material by providing contact while in the molten state and by imparting vibration, preferably ultrasonic vibration. The bond strength resulting from the vibration process is quite high.

While it is not completely clear, it is believed that the rationale for this effect is as follows:

When a difficultly solderable metal such as silicon, germanium, aluminum, titanium, tantalum and zirconium makes contact with air, a firm oxide layer is formed on the surface of the metal. Glass and ceramics of course consist totally of oxides. Such oxides have no affinity for Pb-Sn alloys, so that a solder bonding cannot be obtained. However, the solder of this invention has unpredicable affinity for the oxide layer and the oxide.

In the process for soldering the solder of this invention to the surface of the difficultly solderable material, the soldering surface makes contact with the solder in the molten or semimolten condition, and vibration is applied to the solder. A suitable result can be obtained by applying ultrasonic vibration at a frequency of 20–30 $KH_z$ in a direction parallel to the soldering surface. In a particular case, a soldering spatula is heated at about 250°–450°C and is vibrated in a direction parallel to the soldering surface. During the operation, the soldering spatula applies a frictional force to the soldering surface so that the activity of the oxide surface is improved. The soldering surface is preferably preheated at about 100°–200°C before the soldering operation, so that a strong bond is formed between the solder layer and the oxide surface. The solder layer can usually be coated at a thickness of 0.02–0.2 mm and possibly to several millimeters.

In another process for bonding the solder on the surface of the difficultly solderable material, the vibration, preferably ultrasonic vibration, is applied to a molten solder bath and the difficultly solderable material is dipped, so that the solder is bonded on the surface of the material which makes contact with the molten solder.

The difficultly solderable material which is thus coated with the solder is then contacted with another solderable material, i.e. a solderable metal, and the contact area is then heated to effect mutual adhesion. On the other hand, both difficultly solderable materials can be bonded by coating the solder alloy of this invention onto both surfaces and both the solder coated surfaces can be contacted with each other with the contact area being heated to melt the solder and then cooled to effect bonding.

The tensile strength of the solder used in the invention will depend upon the particular ratio of the Pb:Sn The vibration of the tensile strength to Pb:Sn ratio is shown in the following table.

| Ratio of Pb:Sn in solder | Tensile strength |
|---|---|
| 0.5:9.5 | 406 Kg/cm$^2$ |
| 4:6 | 482 Kg/cm$^2$ |
| 5:5 | 458 Kg/cm$^2$ |
| 6.4 | 446 Kg/cm$^2$ |
| 8:2 | 400 Kg/cm$^2$ |
| 9.5:0.5 | 263 Kg/cm$^2$ |

Where a glass product is being soldered to a metal product, it has been found that by using the techniques of the present invention, the adhesive strength of the solder will be higher than the tensile strength of the glass product. In one test for tensile strength, it was found that a glass product failed under a load of from 70–75 kg/cm$^2$ without failure of the solder bond between the glass surface and the solder layer. In other tests, wherein a high tensile strength ceramic product alumina was bonded to a metal product using the techniques of the present invention. the adhesive strength of the solder bond was found to be so high that although the solder itself failed at the tensile strength indicated in the above table, the soldered phase between the ceramic surface and the solder layer did not fail.

It is therefore a unique advantage of the present invention that difficultly solderable material such as glass, ceramics or the like, can be bonded to a second solderable material with an adhesive strength which is greater than the tensile strength of either the solder itself or the tensile strength of the inorganic oxide product.

The solder alloy of this invention can be effectively applied to the solder layer of the base by applying a conventional solder, mainly composed of Pb and Sn, which is not solderable, to the difficultly solderable material.

In the later case, as stated above, the solder alloy of this invention is coated onto the surface of the glass or ceramic, etc., and then a conventional solder is coated thereon or a solderable material is bonded thereto by use of a conventional solder.

Having generally described the invention, further understanding can be obtained by certain examples which are provided herein for purposes of illustration only and are not intended to be limiting in any manner.

EXAMPLES

The solder alloys having the various compositions shown in the Table were used for soldering a glass plate (soda lime glass plate) having $10^{cm} \times 10^{cm} \times 0.3^{cm}$ of size to a metal plate (22-Cr stainless steel) having $5^{cm} \times 2.5_{cm} \times 0.3^{cm}$ of size.

In the process of the soldering, the glass plate was preheated at 200°C and an ultrasonic vibration soldering spatula was contacted to the solder and heated at 420°C on the glass surface while applying the ultrasonic vibration at a frequency of 20 KH$_z$ and an amplitude of 30μ in the direction parallel to the soldering surface, whereby the solder was bonded to the surface of the glass surface. The resultant combination was then applied to a metal plate and the solder and the metal plate were soldered by heat melting.

In the Table, the cerium misch metal consisted of 86.8 wt. % Ce; 3.0 wt. % La; 4.0 wt. % Nd: 6.2 wt. % Sm and Pr; 3.2 wt. % Fe; 0.37 wt. % Mg; 0.27 wt. % Al; and 0.73 wt. % Si.

On the other hand, in order to test the airtightness at the soldering part, a cylinder made of alumina having $8^{mm}$ of inner diameter, $30^{mm}$ of outer diameter and $7^{mm}$ of length was bonded to the column made of alumina having $20^{mm}$ of outer diameter and $7^{mm}$ of length with the solder stated in the Table. The airtightness of the soldering part was measured by a helium leakage detector to read the volume of leaked helium gas (normal state) under 1 atm., and the value per 1 second (atm. cc/sec) was calculated.

In the airtightness of the Table, "excellent" designates a leak volume of less than $1 \times 10^{-11}$ atm. cc/sec., "fiar" designates a leak volume of $1 \times 10^{-8}$–$1 \times 10^{-11}$ atm. cc/sec. and "inferior" designates a leak volume of more than $1 \times 10^{-8}$ atm. cc/sec..

TABLE

| No. | composition (wt.%) | | | | | | bond strength | water resistance | air-tightness |
|---|---|---|---|---|---|---|---|---|---|
| | Pb | Sn | Zn | Sb | cerium misch metal | other | | | |
| 1 | 92 | 4 | | | 4 | | excellent | fair | fair |
| 2 | 89 | 2 | | 1 | 8 | | excellent | excellent | fair |
| 3 | 69 | 27.6 | | | 3.4 | | excellent | fair | excellent |
| 4 | 55 | 43 | 2 | 2 | 3 | | excellent | excellent | excellent |
| 5 | 45 | 50 | | | 5 | | fair | fair | excellent |
| 6 | 32 | 62 | | 2.7 | 3 | | fair | excellent | excellent |
| 7 | 16 | 80 | 1.5 | 1.5 | 1 | | fair | excellent | excellent |
| 8 | 4 | 90 | 1 | 1 | 4 | | fair | excellent | excellent |
| 9 | 30 | 30 | 25 | | 4 | | excellent | excellent | fair |
| 10 | 23 | 50 | | 25 | 2 | | fair | excellent | excellent |
| 11 | 23 | 72 | | 1.9 | 3 | Al 0.1 | excellent | excellent | fair |
| 12 | 81 | 10 | 2 | 2 | 4 | Al 0.05 | excellent | excellent | fair |

TABLE-continued

| No. | composition (wt.%) | | | | | | bond strength | water resistance | air-tightness |
|---|---|---|---|---|---|---|---|---|---|
| | Pb | Sn | Zn | Sb | cerium misch metal | other | | | |
| | | | | | | Ti 0.04 | | | |
| | | | | | | Si 0.05 | | | |
| | | | | | | Cu 0.86 | | | |
| 13 | 80 | 16 | | 2 | | La 2 | excellent | excellent | fair |
| 14 | 80 | 16 | | 2 | | Nd 2 | excellent | excellent | fair |
| 15 | 80 | 16 | | 2 | | Y 2 | excellent | excellent | fair |
| 16 | 80 | 15 | 1 | 2 | | Nd 2 | excellent | excellent | fair |
| 17 | 10 | 85 | | | | Sc 5 | excellent | fair | excellent |

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A process for applying a solder to a difficultly solderable material having an oxide surface comprising:

heating a solder spatula to about 250°–450°C, preheating the oxide surface to about 100°–200°C before the soldering operation, contacting the difficultly solderable material with a solder consisting essentially of 40–98 wt. % of Pb; 2–50 wt. % of Sn; 1–4 wt. % of at least a metal selected from the rare earth metals; 0–10 wt. % of Zn; 0.05–10 wt. % of Sb; 0–0.01 wt. % of Al; and 0–0.5 wt. % of at least one metal selected from the group consisting of Si, Ti and Be, contacting the solder with the solder spatula, vibrating ultrasonically the solder spatula so that the activity of the oxide surface is improved and a strong bond is formed between the solder and the oxide surface.

2. The process of claim 1 wherein said difficultly solderable materials selected from the group consisting of glass, ceramics, glass-ceramics, pottery, porcelain, refractory oxides, inorganic oxide crystals, silicon, germanium, aluminum, titanium, zirconium and tantalum.

3. A process for applying a solder to a difficultly solderable material having an oxide surface comprising:

heating a solder spatula to about 250°–450°C, preheating the oxide surface to about 100°–200°C before the soldering operation, contacting the difficultly solderable material with a solder consisting essentially of 20–50 wt. % of Pb; 50–98 wt. % of Sn; 1–4 wt. % of at least a metal selected from the rare earth metals; 0–10 wt. % of Zn; 0.05–10 wt. % of Sb; 0–0.01 wt. % of Al; and 0–0.5 wt. % of at least one metal selected from the group consisting of Si, Ti and Be, contacting the solder with the solder spatula, vibrating ultrasonically the solder spatula so that the activity of the oxide surface is improved and a strong bond is formed between the solder and the oxide surface.

4. The process of claim 3 wherein said difficultly solderable material is selected from the group consisting of glass, ceramics, glass-ceramics, pottery, porcelain, refractory oxides, inorganic oxide crystals, silicon, germanium, aluminum, titanium, zirconium and tantalum.

* * * * *